Figure 1:
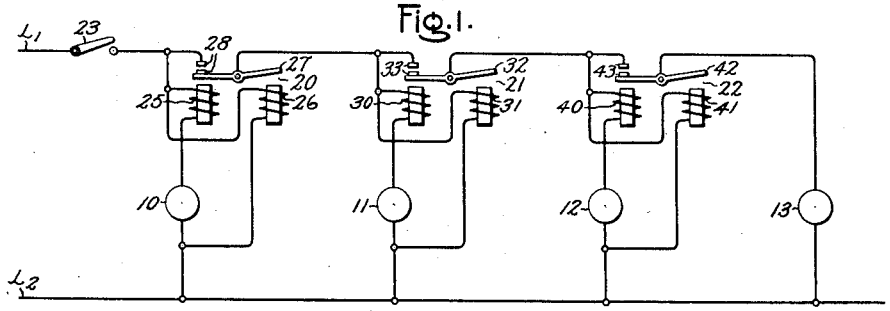

Oct. 19, 1937.    H. R. CRAGO    2,096,626
ELECTRICAL SEQUENCING CONTROL
Filed Sept. 21, 1935

Inventor:
Harry R. Crago,
by Harry E. Dunham
His Attorney.

Patented Oct. 19, 1937

2,096,626

UNITED STATES PATENT OFFICE 2,096,626

ELECTRICAL SEQUENCING CONTROL

Harry R. Crago, Caldwell, N. J., assignor to General Electric Company, a corporation of New York Application September 21, 1935, Serial No. 41,578

6 Claims. (Cl. 172—239)

The invention relates to sequencing control for electrically energized devices, particularly devices having the inherent characteristic of decreasing the energizing current thereof a time interval after the initial energization thereof.

One of the principal objects is to provide improved automatic electrical sequencing apparatus for a plurality of such devices in which the inherent decreasing current characteristic of each device is utilized to provide a time delay in the sequential energization of the succeeding device.

A further object is to provide an improved sequencing control particularly adapted for air conditioning work wherein a plurality of electric motors are operated under the control of thermostats.

A special object is to provide an improved automatic electrical sequencing control for a plurality of electric motors employed in service, such as residential air conditioning work where the maximum line current of the motors must be limited below a predetermined value.

Ordinarily residential electrical power supply lines are limited by the underwriters' code or by the electric power company's rules to a certain maximum current rating, usually 15 amperes. This is to prevent not only seriously overloading the lines but also undesirable flicker or dimming of electric lights due to the reduction in voltage which may occur whenever the maximum current rating is exceeded even temporarily. With such power supply lines, any electric motor driven apparatus having a relatively large current rating, such as air conditioning apparatus or the like, must be specially controlled to limit the maximum current that can be supplied to the apparatus. This is particularly true where the apparatus involves a number of electric motors, each having the starting current thereof greater than the normal running current. In case all of the motors should be started at the same time, the starting current thereof may be two or three times the normal running current.

Although not necessarily limited thereto, the improved electrical sequencing control of the present invention is particularly adapted for use in service of the character indicated above. In such service the present invention insures that not more than one of the electric motors is started at a time and that the succeeding motor is not started until after the starting current of the preceding motor has decreased to the normal running value. This enables the starting current of the entire apparatus to be limited to a value only slightly greater than that of the total normal rating of all the motors employed.

Figure 2:
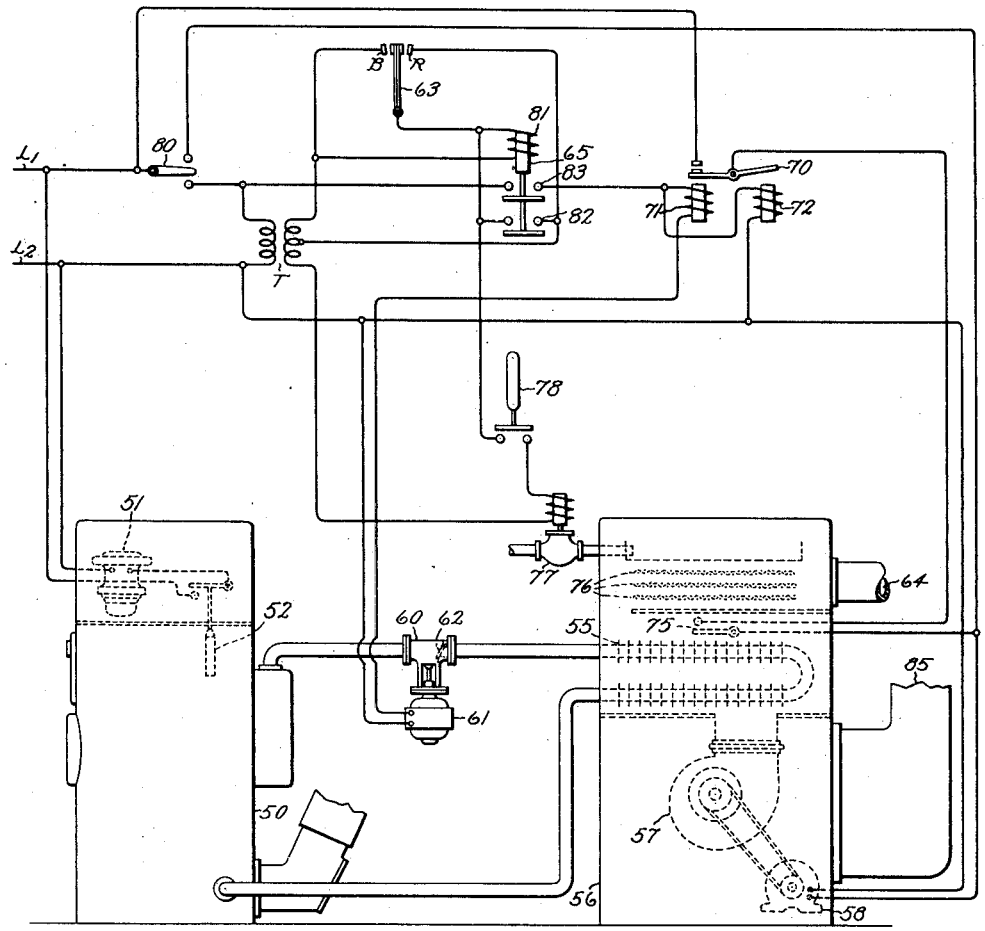

While the present invention is of general application and the principle thereof may be carried out in various ways by those skilled in the art, the best mode in which applicant has contemplated applying that principle is illustrated in the accompanying drawing in which Fig. 1 is a schematic circuit diagram showing in simplified form the improved electrical sequencing control for a plurality of electrical devices of the present invention and Fig. 2 is a schematic circuit diagram illustrating an embodiment of the invention in a thermostatically controlled air conditioning system having a plurality of operating motors.

As shown diagrammatically in Fig. 1, the invention is applied to effect the energization of a plurality of electrical devices 10, 11, 12 and 13 from the supply lines $L_1$, $L_2$ in timed sequence. Each of the devices 10, 11, 12, and 13 may be an electric motor, an electric lamp or any other electrical device having the initial energizing current thereof greater than the normal running current and automatically decreasing from the greater value to the lesser value a time interval after the initial energization of the device. With the ordinary type of electric motor, the intial energizing current with the motor at standstill is usually considerably larger in value than the normal running current. As the motor accelerates from standstill to the normal running speed, the initial energizing current decreases to the normal running value. Likewise with an electric lamp and certain other forms of electrically energized devices, the energizing current usually is at a higher value than the normal running current for a short interval after the device is initially energized.

In accordance with the present invention the differential electroresponsive devices 20, 21 and 22 are connected respectively in circuit with the electrical devices 10, 11, 12 and 13 to effect the energization thereof in timed sequence. The main line switch 23 controls the energization of the first electrical device 10. In the preferred form shown, the electroresponsive circuit controlling device 20 is provided with a series winding 25 and a shunt winding 26 which operates differentially upon the centrally pivoted armature 27. The armature 27 is normally biased by gravity or a suitable spring to the position shown so that the contacts 28 are maintained in the circuit opening position when both of the windings 25 and 26 are deenergized. The winding 25 is connected in series with the electrical device 10 and the potential winding 26 is connected in shunt with the electrical device 10. Each of the differential devices 21 and 22 is of similar construction to the device 20 as just described.

In operation when the main line switch 23 is closed, the series winding 25 of the differential device 20 is then energized in series circuit with the electrical device 10 from the supply lines $L_1$, $L_2$. At the same time the potential winding 26 is energized in shunt with the electrical device 10. However, as long as the energizing current of the electrical device 10 exceeds the normal running value, the series winding 25 provides a magnetic force of sufficient value to maintain the armature 27 in its biased position against the force set up by the potential winding 26 tending to close the contacts 28. However, after the time interval required for the initial energizing current of the electrical device to decrease from the starting value to the running value, the magnetic force set up by the winding 25 becomes less than that provided by the potential winding 26. Thereupon the armature 27 is operated about its central pivot to close the contacts 28. This serves to energize the next succeeding electrical device 11 with the series and shunt windings 30 and 31 of the differential electrical device 21 in circuit therewith. In the same manner as previously described, the armature 32 is maintained in its initial position until after the starting current of the electrical device 11 has decreased to the normal running value. Then the armature 32 is operated by the preponderance of the magnetic pull of the potential winding 31 over the magnetic pull of the series winding 30 to operate the armature 32 to close the contacts 33. Thereupon the electrical device 12 is energized with the series winding 40 and the potential winding 41 in circuit therewith. These windings serve to operate the armature 42 to close contact 43 after the expiration of the time interval required for the initial energizing current of the electrical device 12 to decrease to the normal running value. This then energizes the last electrical device 13.

While a series of four electrical devices 10, 11, 12 and 13 have been illustrated, it will be apparent to those skilled in the art that by the provision of additional differential devices any desired number of electrical devices may be added to the series for energization in timed sequence. Furthermore, any ordinary type of differential electroresponsive devices may be employed, if desired, for effecting the sequential energization of the electrical devices.

In the specific embodiment of the invention illustrated in Fig. 2, a hot water boiler furnace 50 is provided with an automatic electric motor driven combustion device 51, such for example, as an oil burner, for heating the water therein. The operating motor of the burner 51 is energized from the supply lines $L_1$, $L_2$ under the control of a suitable thermostatic switch 52 which is responsive to the temperature of the water in the boiler 50. By this means the burner 51 is automatically started and stopped so as to maintain the temperature of the water in the boiler 50 within certain predetermined limits.

Hot water from the boiler 50 is supplied to the air heating radiator 55 of an air conditioning unit 56 having an air circulation fan 57 driven by the electric motor 58. The circulation of water from the boiler to the heater coil 55 is controlled by the circulating pump 60 having the driving motor 61 and a check valve 62 for stopping circulation when the motor 61 is deenergized. A room thermostat 63, responsive to the heating action of the air delivered from the air conditioning unit 56 through the duct 64 controls the energization and deenergization of the electromagnetic switch 65 which in turn controls the energization and deenergization of the circulating motor 61.

To insure timed sequential starting of the fan motor 58 after the starting current of the circulating motor 61 has decreased to the normal value, the differential electrical responsive circuit controlling device 70 is provided. This device has a series winding 71 connected to be energized in series circuit with the circulating motor 61 and a shunt winding 72 connected to be energized in multiple with the circulating motor 61. The thermostat 75 is connected in circuit with the electromagnetic device 70 to prevent operation of the fan motor 58 at times when the hot water heating coil 55 is not heated. Thus, the contacts of thermostat 75 must be closed, thereby indicating that the hot water heating coil 55 is heated, before the fan motor 58 can operate.

The air conditioner 56 is provided with suitable humidifying screens 76 to which water is supplied under the control of the electromagnetically operated valve 77 which in turn may be controlled by a humidity responsive device 78.

In operation of the air conditioning system shown in Fig. 2, the switch 80 is manually operated to select either thermostatically controlled heating operation or operation of the air circulation fan 58 alone without operation of any of the other elements. Thus in the upper position of switch 80 the fan motor 58 is energized directly from the supply lines $L_1$, $L_2$.

With selector switch 80 in its lower position, the operation of the heating equipment is controlled by the room thermostat 63 in the following manner. When the bimetallic blade of the thermostat 63 engages with the contact R, the winding 81 of the electromagnetic switch 65 is energized from the upper portion of the secondary windings of the transformer T which has its primary windings connected to the supply lines $L_1$, $L_2$. Upon closure of switch 65, the contact 82 thereof shunts the thermostatic blade 63 to maintain the winding 81 energized. Contact 82 also energizes the circuit controlled by the humidity device 78. At the same time contact 83 closes to energize the circulating motor 61 with the series winding 71 in series circuit therewith. Also the shunt winding 72 is energized at the same time. After the circulating motor 61 has accelerated and the starting current thereof has decreased to the normal running value, the contacts of the electroresponsive circuit controlling device 70 are closed to energize the fan motor 58 provided thermostat 75 is in the closed position. This insures that the two motors 58 and 61 are always started in a timed sequence which will prevent the starting current of both motors occurring at the same time.

The operation of the water circulating pump 60 by the motor 61 serves to force the hot water from the boiler 50 through the air heating coil 55. The operation of the air circulating fan 57 by the motor 58 serves to blow air over the coils 55 and then through the zone in which the humidifying screens 76 are located, the air entering the conditioning device 56 through the duct 85 and leaving through one or more distribution conduits 64.

When the room air temperature rises above the desired value, the blade of the room thermostat 63 moves out of engagement with the contact R and into engagement with the contact B. This effectively short circuits the operating winding 81 of the control relay 65. As a result the relay 65 operates to open the contacts 82 and 83, thereby deenergizing the circulating motor 61 as well as the circuit including the water valve 77 and also the windings of the differential device 70. This permits the contacts of the device 70 to return to the open position in accordance with their bias and thereby deenergize the air blower motor 58.

The room thermostat 63 will, of course, return into engagement with contact R when the room temperature falls below the desired value. In case this should occur when the thermostat 75 is closed thus indicating that the air heating coils 55 are heated, the differential device 70 serves to provide sequential starting of the circulating motor 61 and the fan motor 58.

What I claim as new and desire to secure by Letters Patent of the United States is:

1. In a sequencing system, the combination of a plurality of electrically energized elements, one of said elements having the initial energizing current thereof greater than the running current, and electroresponsive means having differential series and potential windings connected in circuit with said one element and provided with circuit controlling means operable only after the initial energizing current of said one element has decreased to the running value for controlling the energization of another of said elements.

2. In a sequencing system, the combination of a pair of electrically energized elements, at least one of said elements having the initial energizing current thereof greater than the running current, circuit controlling means for energizing said one element, and electroresponsive means having a winding connected to be energized in series circuit with said one element and a differential winding connected to be energized in multiple circuit with said one element and provided with switch mechanism operable for energizing the second element only after the initial energizing current of the first element decreases to the running value.

3. In a sequencing system, the combination of a pair of electrically energized elements, at least one of said elements having the initial energizing current thereof greater than the running current, circuit controlling means for separately energizing said one element, a differential electroresponsive circuit controlling device biased to the circuit opening position and having a potential winding connected to be energized simultaneously with said one element for setting up a magnetic force tending to operate the device to the circuit closing position and a current winding connected in series with said one element for setting up a magnetic force for maintaining the device in the circuit opening position until the initial energizing current of said one element decreases to the running value.

4. In a sequential motor starting control system the combination with a pair of electric motors, of circuit controlling means for starting the first motor and electroresponsive circuit controlling means for starting the second motor having differential series and potential windings connected in circuit with the first motor for operating the electroresponsive circuit controlling means only after the acceleration of the first motor.

5. The combination of a plurality of electric motors, automatic switch mechanism for energizing one of said motors, automatic electrical responsive switch mechanism having differential series and shunt windings connected to be energized with said one motor and provided with contact mechanism for energizing another one of said motors after the starting current of the said one motor has decreased to the running value.

6. The combination of a plurality of electric motors, automatic switch mechanism for energizing one of the motors, electroresponsive means having one winding connected to be energized in series circuit with said one motor and a differential winding connected to be energized in shunt with said one motor and provided with switch mechanism for energizing another one of said motors when the starting current of said one motor has decreased to the running value, and separate automatic switching means cooperating with said contact mechanism for controlling the energization of said other motor.

HARRY R. CRAGO.